June 10, 1947.   J. G. OETZEL   2,421,757
ELECTROMAGNETIC FRICTION DEVICE
Filed April 7, 1944

INVENTOR
John George Oetzel
By Carlson, Pitzner, Hubbard & Wolfe
ATTORNEYS

Patented June 10, 1947

2,421,757

UNITED STATES PATENT OFFICE 2,421,757

ELECTROMAGNETIC FRICTION DEVICE

John George Oetzel, Beloit, Wis., assignor to Warner Electric Brake Manufacturing Company, Beloit, Wis., a corporation of Illinois Application April 7, 1944, Serial No. 529,937

4 Claims. (Cl. 188—164)

This invention relates to friction devices having relatively rotatable faces that are brought into gripping engagement electromagnetically.

The primary object is to provide in a friction device of the above character a magnet which achieves substantially maximum efficiency during its initial energization in service use and this without danger of being damaged when the energization is a maximum.

Another object is to provide a novel magnet whose poles will not become fused to a coacting friction surface during an initial full energization of the magnet.

A more detailed object is to locate the face of the inner pole of a magnet of the above character slightly below the friction face of the magnet.

A further object is to protect a magnet of the above character against warping of its friction face under severe operating conditions.

Other objects and advantages of the invention will become apparent from the following detailed description taken in connection with the accompanying drawings, in which Figure 1 is a diametrical cross sectional view.

Figure 1:
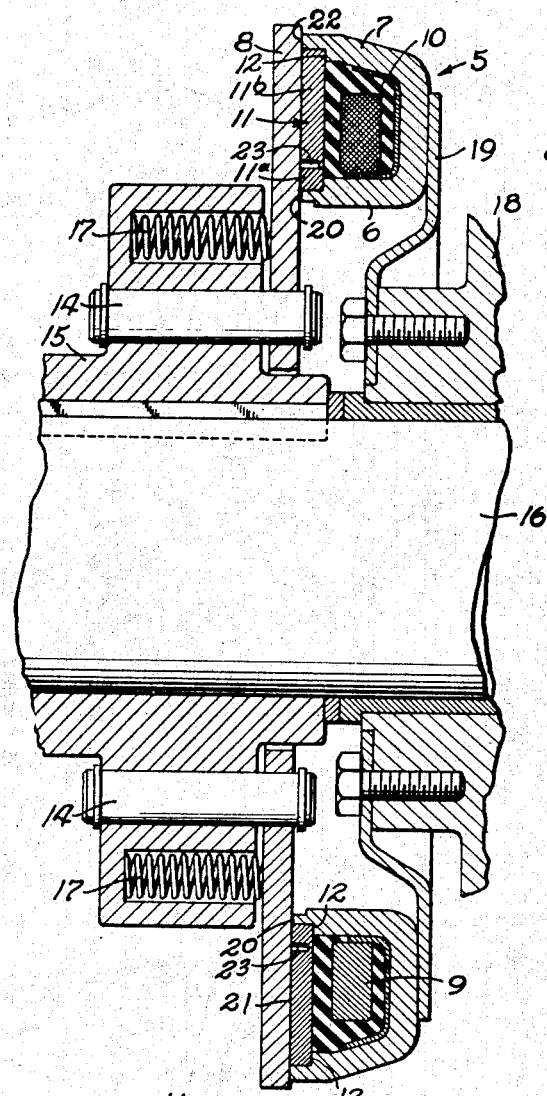
Figure 2:
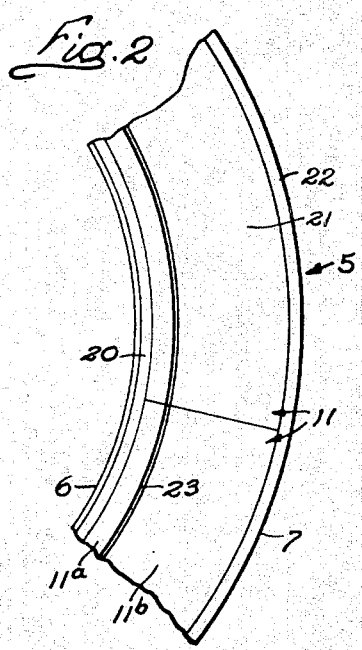
Fig. 2 is a fragmentary face view of the magnet.
Figure 3:
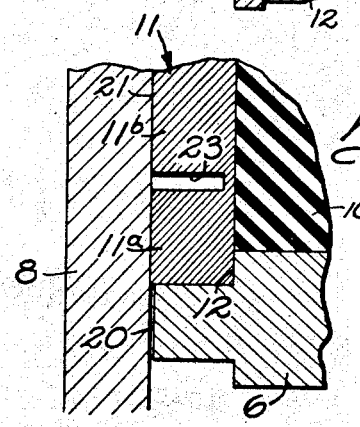
Fig. 3 is an enlarged view of a portion of Fig. 1.

In the drawings, the invention is shown embodied in an electromagnetic friction brake comprising a magnet 5 providing a pair of concentric pole pieces 6 and 7 bridged by an armature 8 which is rotatable relative to the magnet and adapted for axial gripping engagement with the friction face of the magnet. Herein, the magnet is a ring of generally U-shaped cross-section in which a coil 9 is disposed and secured by a hardened filling 10. Segments 11 of non-magnetic friction material such as ordinary brake lining are pressed in between the inner and outer pole pieces 6 and 7 and are seated against shoulders 12 thereon. The segments are also backed by and adhesively secured to the filling 10.

In the form shown, the armature 8 comprises a flat ring of magnetic material spanning the pole pieces of the magnet and, in this instance, supported for axial movement by a plurality of pins 14 annularly spaced around a supporting member 15 which herein is keyed to a rotatable shaft 16. Light springs 17 carried by the member 15 act on the armature to urge it toward the magnet and thereby at all times maintain light mechanical contact between the coacting surfaces of the armature and magnet.

If the friction device is to be used as a brake, the magnet is mounted stationarily on a member 18. This may be accomplished through the medium of a plate 19 screwed to the member 18 and fastened, as by welding, to the back of the magnet.

When the coil 9 is energized, magnetic flux will thread the substantially closed circuit through the magnet and armature and around the coil, the armature thus being drawn into gripping engagement with the friction face of the magnet. The elements thus engaged will transmit torque of a magnitude determined by the degree of energization of the coil.

In accordance with the present invention, provision is made for preventing damage to or the creation of an air gap of objectionable width between the armature and one pole face under severe operating conditions encountered during an initial heavy energization of the clutch or brake. For this purpose, the face 20 of the inner magnet pole 6 is initially, that is, as the friction device is conditioned for initial service use, disposed slightly below the plane of the friction surface 21 so that actual mechanical contact between the metallic pole and armature faces is prevented during the initial energization of the device regardless of how severe the energization may be. This spacing is only a few thousandths of an inch, preferably two or three, and, therefore, does not lessen the developed torque an objectionable amount for any appreciable period of service use. That is to say, the friction material wears down sufficiently in a short period to allow the metallic surfaces to come into full contact. By this initial spacing of the friction face 21 above the pole face 20, it is impossible for the surfaces to come together initially, thereby avoiding the danger of tearing off minute pieces of metal from the pole face 20 and fusion of these pieces to the metal armature surfaces where such pieces would create an air gap of objectionable width in the magnetic circuit and a consequent reduction in torque transmitted. It has been found that such detrimental action does not ordinarily take place at the outer pole face 22 apparently because the dust or other particles produced by abrasive action in the initial contact between the magnet and armature serve to prevent the tearing action above referred to. Accordingly, the outer pole face usually may be disposed initially exactly flush with the friction surface 21.

Means is provided to allow for radial expansion of the inner magnet pole 6 under the friction heat developed in service use of the device while at the same time protecting the inner pole face 20 by an adjacent wear resistant surface. This means, as shown, comprises a narrow annular gap 23 dividing the friction material 11 into inner and outer segments 11ª and 11ᵇ and spaced only a short distance, about one-fourth of an inch, outwardly from the pole 6. A 1/16 of an inch gap is sufficiently wide, and this may be cut completely through the friction material or stopped short of the inner surface thereof as shown. Such a gap allows the inner pole to bend outwardly under the heat generated at the friction surfaces, and the inner segment 11ª immediately adjacent the pole face 20 effectually prevents contact initially with the armature or excessive wearing off of the face after such contact becomes established in the initial service use.

With the magnet constructed as above described, the magnet and armature surfaces are brought into the desired relationship after a short period of service use, and remain in this relation throughout the service life of the device. It is unnecessary, therefore, to operate the device or wear-in the surfaces before the device is placed in service use.

No claim is made herein to the manner of mounting the magnet and armature rings, which mounting is disclosed in and forms the subject matter of my copending application Serial No. 567,187, filed December 8, 1944.

I claim as my invention:

1. In an electromagnetic friction device, a magnet adapted for axial gripping engagement with a flat annular armature surface and comprising inner and outer concentric annular pole pieces providing axially facing end surfaces radially spaced apart, and non-magnetic friction material supported between said pole pieces and having a gripping face disposed substantially in the plane of the outer one of said end surfaces but spaced axially of the magnet a few thousandths of an inch above the end surface of the inner pole piece so as to prevent actual mechanical contact between the latter surface and the armature surface during the first few energizations of said magnet and thereafter allow actual mechanical contact.

2. In an electromagnetic friction device, a magnet comprising inner and outer concentric pole pieces radially spaced apart and providing end faces lying in parallel planes with the plane of the inner end face spaced a few thousandths of an inch below the plane of the outer pole face, and friction material rigidly supported between said pole pieces and presenting a friction face lying in the plane of said outer pole face and acting during the initial energiaztion of the magnet to hold said inner pole face out of mechanical contact with the coacting armature.

3. In an electromagnetic friction device, a magnet comprising inner and outer concentric pole pieces radially spaced apart and providing end faces lying substantially in a common plane but with the face of the inner pole piece disposed a few thousandths of an inch below the plane of the outer pole face, and friction material rigid with and supported between said pole pieces with its outer surface substantially flush with said outer pole face, said friction material having an annular groove of narrow radial width formed therein but radially spaced outwardly from said inner pole piece so that the intervening ring of friction material operates during the initial energization of the magnet to maintain the narrow axial spacing of said inner and outer pole faces.

4. In an electromagnetic friction device, a magnet adapted for axial gripping engagement with a flat armature surface and comprising inner and outer concentric pole pieces radially spaced apart and having end faces lying in closely spaced parallel planes with the plane of the inner end face spaced below the plane of the outer pole face, and friction material rigidly supported between said pole pieces and presenting a friction face disposed a few thousandths of an inch above said inner pole face so as to hold the latter face out of mechanical contact with the coacting armature surface during the initial energization of the magnet, and said outer pole face being disposed relative to said friction face so as to permit of mechanical contact between the armature surface and said outer pole face during said initial energization of the magnet.

JOHN GEORGE OETZEL.

REFERENCES CITED

The following references are of record in the file of this patent:

UNITED STATES PATENTS

| Number | Name | Date |
|---|---|---|
| Re. 12,581 | Schuster et al. | Dec. 18, 1906 |
| 2,068,654 | Cadman | Jan. 26, 1937 |
| 2,351,598 | Cadman | June 20, 1944 |
| 2,353,750 | Oetzel | July 18, 1944 |